United States Patent
Deng et al.

(10) Patent No.: US 10,789,271 B2
(45) Date of Patent: Sep. 29, 2020

(54) SYSTEM, METHOD, AND APPARATUS FOR SYNCHRONIZATION AMONG HETEROGENEOUS DATA SOURCES

(71) Applicant: ALIBABA GROUP HOLDING LIMITED, George Town, Grand Cayman (KY)

(72) Inventors: Xiaoyong Deng, Hangzhou (CN); Shouyuan Chen, Hangzhou (CN); Jianchao He, Hangzhou (CN)

(73) Assignee: ALIBABA GROUP HOLDING LIMITED, George Town, Grand Cayman (KY)

(*) Notice: Subject to any disclaimer, the term of this patent is extended or adjusted under 35 U.S.C. 154(b) by 428 days.

(21) Appl. No.: 15/099,908

(22) Filed: Apr. 15, 2016

(65) Prior Publication Data
US 2016/0306867 A1    Oct. 20, 2016

(30) Foreign Application Priority Data

Apr. 16, 2015  (CN) .......................... 2015 1 0179809

(51) Int. Cl.
*G06F 16/27*   (2019.01)
*G06F 16/25*   (2019.01)
*G06F 9/445*   (2018.01)

(52) U.S. Cl.
CPC ........ *G06F 16/275* (2019.01); *G06F 9/44521* (2013.01); *G06F 16/258* (2019.01); *G06F 16/27* (2019.01)

(58) Field of Classification Search
CPC ........... G06F 17/30581; G06F 9/44521; G06F 17/30575; G06F 17/30578; G06F 17/30174

USPC ........................................................ 707/611
See application file for complete search history.

(56) References Cited

U.S. PATENT DOCUMENTS 6,678,700 B1   1/2004  Moore et al.
6,694,336 B1   2/2004  Multer et al.
(Continued)

FOREIGN PATENT DOCUMENTS

CN   101916298 A   12/2010
CN   102411506 A    4/2012
(Continued)

OTHER PUBLICATIONS

PCT International Search Report and Written Opinion dated Jul. 15, 2016, issued in corresponding International Application No. PCT/US2016/027798 (7 pages).
(Continued)

*Primary Examiner* — Hosain T Alam
*Assistant Examiner* — Nicholas E Allen
(74) *Attorney, Agent, or Firm* — Finnegan, Henderson, Farabow, Garrett & Dunner, LLP

(57) ABSTRACT

A method for synchronizing data among heterogeneous data sources is disclosed. The method may comprise obtaining a synchronization task and a corresponding operation classification, determining one or more Reader plugins and Writer plugins based on the corresponding operation classification, segmenting the synchronization task based on the one or more Reader plugins and Writer plugins to generate a Task queue, and using a corresponding number of the Reader plugins and the Writer plugins based on the Task queue to implement the synchronization task. The one or more Reader plugins may be configured to read data from a source and to send to the one or more Writer plugins, and the one or more Writer plugins may be configured to write the data to a destination.

17 Claims, 5 Drawing Sheets

(56) References Cited

U.S. PATENT DOCUMENTS

| | | |
|---|---|---|
| 8,453,136 B1 | 5/2013 | Hahn et al. |
| 2002/0091702 A1 | 7/2002 | Mullins |
| 2002/0156792 A1 | 10/2002 | Gombocz et al. |
| 2003/0145003 A1 | 7/2003 | Yellepeddy et al. |
| 2006/0212465 A1 | 9/2006 | Fish et al. |
| 2007/0073899 A1 | 3/2007 | Judge et al. |
| 2008/0046414 A1* | 2/2008 | Haub ................. G06F 17/30312 |
| 2008/0147745 A1* | 6/2008 | Wilkinson .............. G06F 9/505 |
| 2012/0030172 A1 | 2/2012 | Pareek et al. |
| 2012/0130945 A1 | 5/2012 | Dalfo et al. |
| 2012/0158699 A1 | 6/2012 | Creel |
| 2014/0040182 A1 | 2/2014 | Gilder et al. |
| 2014/0181016 A1* | 6/2014 | Whitehead .............. G06F 11/00 707/613 |
| 2014/0297771 A1* | 10/2014 | Kotamarti ........... H04L 67/1095 709/206 |

FOREIGN PATENT DOCUMENTS

| | | |
|---|---|---|
| CN | 102521387 A | 6/2012 |
| CN | 102681882 A | 9/2012 |
| CN | 102999537 A | 3/2013 |
| CN | 103092980 A | 5/2013 |
| CN | 103617176 A | 3/2014 |
| EP | 2 891 994 A1 | 7/2015 |
| WO | WO 2007/035344 A1 | 3/2007 |

OTHER PUBLICATIONS

First Office Action issued by The State Intellectual Property Office of People's Republic of China, in correspondence Japanese Application No. 201510179809.X, dated Jan. 25, 2019 (English-language) (16 pgs.).

First Search Report issued in Chinese Application No. 201510179809.X, dated Jan. 17, 2019 (2 pgs.).

\* cited by examiner

SYSTEM, METHOD, AND APPARATUS FOR SYNCHRONIZATION AMONG HETEROGENEOUS DATA SOURCES

CROSS REFERENCE TO RELATED APPLICATION

The present application is based on and claims the benefits of priority to Chinese Application No. 201510179809.X, filed Apr. 16, 2015, the entire contents of which are incorporated herein by reference.

TECHNICAL FIELD

The present application relates to methods, apparatus, and systems for synchronization among heterogeneous data sources.

BACKGROUND

Structured data commonly refers to data with row and column structures, including, for example, relational database management system (RDBMS) data (e.g., MySQL and Oracle), NoSQL data (e.g., Hive, ODPS, and oceanbase), and .csv data. Semi-structured data refers to data from which row/column structures can be extracted, such as log data with defined columns, .txt file data, and Hadoop file system data. To realize synchronization between the structured and semi-structured data, an open-source project called Sqoop is usually used. As shown in FIG. 1, Sqoop can transform data from Hadoop to RDSMS or vice versa. Using a Map-Reduce framework, it can import HDFS data of Hadoop to RDBMS, or export HDFS data to RDBMS. Sqoop can also add various databases by corresponding plug-ins.

However, the open-source Sqoop has the following issues:

1) Current synchronization solutions of different storages supported by many systems rely heavily on read/write coupling and are generally built to import/export data produced respectively by its own system. Therefore, such data synchronization solutions cannot become a general tool and even require special paths. For example, Sqoop is limited to synchronization between HDFS and outside sources.

2) To synchronize data among different storages, Sqoop has introduced complicated frameworks and therefore, increases application requirement. For example, Sqoop needs to be implemented in a Map-Reduce framework.

3) When data amount is large, it is difficult to realize synchronization task segmentation, causing a slow and inefficient synchronization.

4) Sqoop may solve some data import/export problems in certain situations, but is not a general tool and cannot synchronize data between structured and semi-structured storage systems. Also, Sqoop needs a complicated framework and environment and, therefore, can be hard to use.

SUMMARY

One aspect of the present disclosure is directed to a method for synchronizing data among heterogeneous data sources. The method may comprise obtaining a synchronization task and a corresponding operation classification, determining one or more Reader plugins and Writer plugins based on the corresponding operation classification, segmenting the synchronization task based on the one or more Reader plugins and Writer plugins to generate a Task queue, the one or more Reader plugins being configured to read data from a source and to send to the one or more Writer plugins, and the one or more Writer plugins being configured to write the data to a destination, and using a corresponding number of the Reader plugins and the Writer plugins based on the Task queue to implement the synchronization task.

Another aspect of the present disclosure is directed to an apparatus for synchronizing data among heterogeneous data sources. The apparatus may comprise a receiving module configured to obtain a synchronization task and a corresponding operation classification, a selecting module configured to determine one or more Reader plugins and Writer plugins based on the corresponding operation classification, a generation module configured to segment the synchronization task based on the one or more Reader plugins and Writer plugins to generate a Task queue, and an implementation module configured to implement the synchronization task by the one or more Reader plugins and Writer plugins corresponding to a Task queue. The one or more Reader plugins may be configured to read data from a source and to send to the Writer plugins, and the one or more Writer plugins may be configured to write the data to a destination.

Another aspect of the present disclosure is directed to a non-transitory computer-readable storage medium storing one or more programs, the one or more programs comprising instructions which, when executed by a processor of a computer system, cause the computer system to perform a method. The method may comprise receiving a synchronization task and a corresponding operation classification, determining one or more Reader plugins and Writer plugins based on the corresponding operation classification, segmenting the synchronization task based on the one or more Reader plugins and Writer plugins to generate a Task queue, and using a corresponding number of the Reader plugins and the Writer plugins based on the Task queue to implement the synchronization task. The Reader plugins may be configured to read data from a source and to send to the Writer plugins and the Writer plugins may be configured to write the data to a destination.

Additional features and advantages of the present disclosure will be set forth in part in the following detailed description, and in part will be obvious from the description, or may be learned by practice of the present disclosure. The features and advantages of the present disclosure will be realized and attained by means of the elements and combinations particularly pointed out in the appended claims.

It is to be understood that the foregoing general description and the following detailed description are exemplary and explanatory only, and are not restrictive of the invention, as claimed.

BRIEF DESCRIPTION OF THE DRAWINGS

The accompanying drawings, which constitute a part of this specification, illustrate several embodiments and, together with the description, serve to explain the disclosed principles.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments consistent with the present invention do not represent all implementations consistent with the invention. Instead, they are merely examples of systems and methods consistent with aspects related to the invention as recited in the appended claims.

Figure 1:
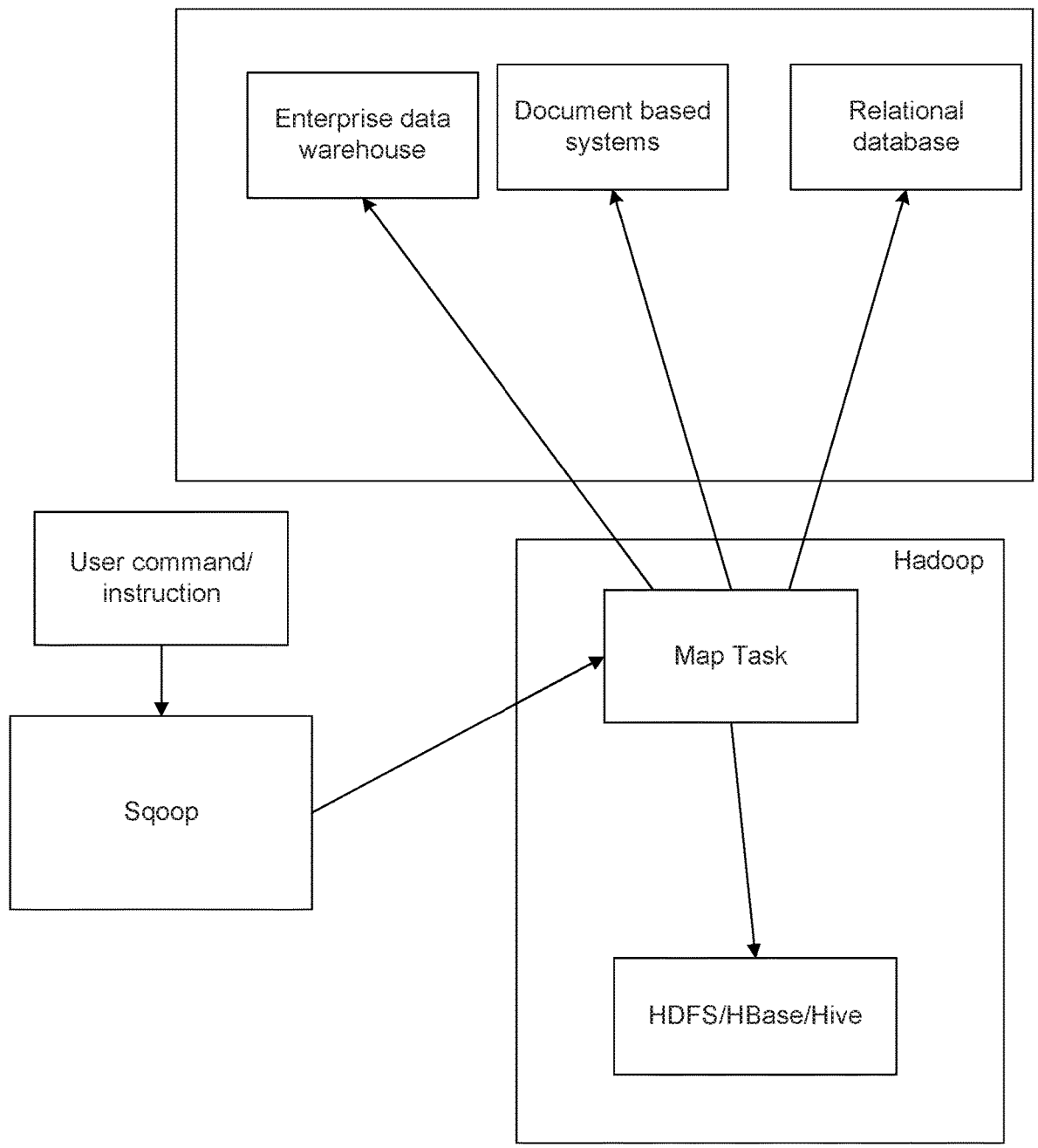
FIG. 1 illustrates a structural diagram of an exemplary Sqoop system in the prior art.
Figure 2:
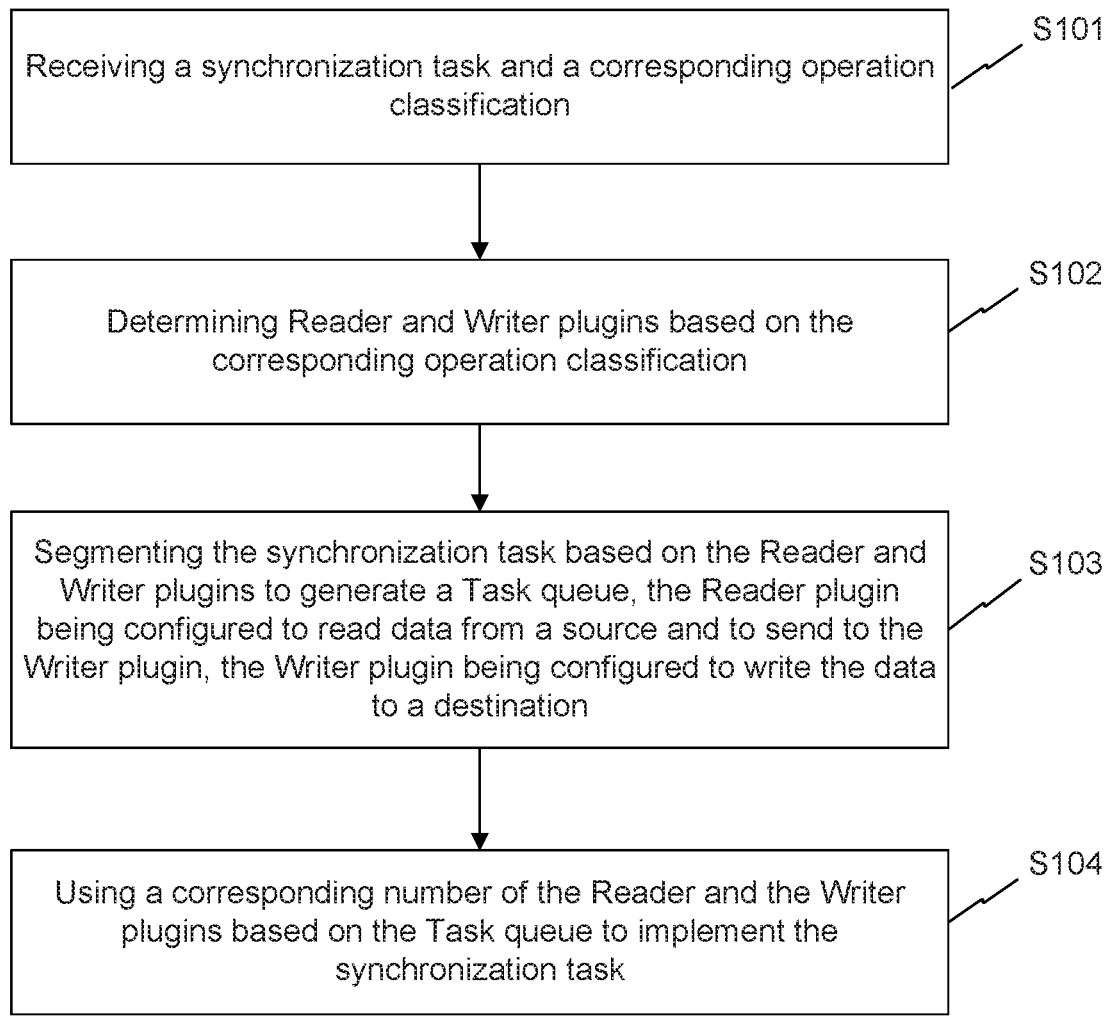
FIG. 2 is a flow diagram illustrating a method for synchronization among heterogeneous data sources, according to an exemplary embodiment.

FIG. 2 is a flow diagram illustrating a method 200 for synchronization among heterogeneous data sources, according to an exemplary embodiment. The method includes a number of steps, some of which are optional. The method may be performed by a computer system.

Step S101: the computer system receives a synchronization task and obtains a corresponding operation classification of the synchronization task. In one embodiment, a Java ClassLoader may be responsible for loading compiled byte code into a Java virtual machine, creating isolated Java class spaces. A system Framework of the computer system may receive the synchronization task via a first ClassLoader and may determine an operation classification corresponding to the synchronization task. The operation classification may include synchronization in the same system or between different systems. For example, synchronization in the same system can be synchronization in MySQL. Synchronization between different systems can be synchronization between MySQL and Oracle database.

Step S102: the computer system determines one or more Reader plugins and Writer plugins based on the corresponding operation classification. For data synchronization, the Reader plugin may be responsible for extracting source data and may be pluginable; the Writer plugin may be responsible for writing data to a target position and may also be pluginable.

In one embodiment, the Reader and the Writer plugins may be the same type or different types of plugins.

In one embodiment, the Reader and the Writer plugins may each have an independent thread. For example, after the system Framework determines the operation classification, it can determine corresponding Reader and Writer plugins according to the operation classification. In other words, a synchronization task can use a Reader plugin and a Writer plugin according to the source database type and the destination database type. For example, a MySQLReader plugin reads MySQL and a MySQLWriter writes MySQL. The Reader and the Writer plugins can be the same or different types of plugins. For another example, the Reader and the Writer plugins can both be MySQL database type. For yet another example, the Reader plugin can be a MySQL database type and the Writer plugin can be an Oracle database type. Different types of Reader and Writer plugins can be used in any combination to realize synchronization among data of different source and destination and separating the Reader plugin and the Writer plugin.

Step S103: the computer system segments the synchronization task based on the Reader and Writer plugins to generate a Task queue, the Reader plugin being configured to read data from a source and to send the data to the Writer plugin and the Writer plugin being configured to write the data to a destination.

In one embodiment, the Reader and the Writer plugins include init( ), prepare( ), post( ), and destroy( ) methods. For example, after the system Framework determines the corresponding Reader and Writer plugins, the system Framework segments the synchronization task based on the Reader and Writer plugins to generate a Task queue. The Reader and the Writer plugin each include two parts: a Job and a Task. The Job may be a complete synchronization project, corresponding to a logic table. The Task may be a (finest) part of a complete synchronization project, corresponding to a sub logic table or a data segment. Thus, the Job can embody a realization of the system Framework and the Task can embody a realization of the synchronization task segmentation, separating the system Framework and the plugins.

In some embodiments, the Job of the Reader plugin can be different from the Job of the Writer plugin. The Task of the Reader plugin may comprise methods such as startReader( ) to extract data from a source. The Task of the Writer plugin may comprise a start startWrite( ) method, to write data to a destination. The Job and the Task can implement methods such as inti( ), prepare( ), post( ), and destroy( ), for preparation before the actual data synchronization and cleanup after the synchronization. The Reader and the Writer plugins may comprise settings, such as name, data-entry-class, and description, which can be loaded at system Framework level.

In some embodiments, the Reader and the Writer plugins, when implemented, can each include a Job and a Task. The Job and the Task can, but not necessarily, include the methods described above depending on the operation environment. The Job may comprise methods such as inti( ), prepare( ), post( ), and destroy( ). Method init( ) can initialize a global operation, such as checking if settings are legal or adjusting settings. Method prepare( ) can prepare for the global operation, such as printing external labels during Job operation, or cleaning data at a destination, preparing for the synchronization operation of the Job. Method post( ) can follow-up after the global operation, such as printing external labels after the Job operation and releasing global resources. Method destroy( ) can clean-up the global operation, such as cleaning up logs.

The Task may comprise methods such as inti( ), prepare( ), post( ), and destroy( ), Method init( ) can initialize some operation after the segmentation, such as checking if the settings of the corresponding plugin are complete or adjusting settings of the corresponding plugin. Method prepare( ) can prepare for some operation after the segmentation, such as detecting connections. Method post( ) can follow-up after some post-segmentation operation, such as releasing connections. Method destroy( ) can clean-up some post-segmentation operation, such as releasing internal memory space.

Step S104: the computer system uses a corresponding number of the Reader and the Writer plugins based on the Task queue to implement the synchronization operation.

In one embodiment, a second ClassLoader, by generating a plugin namespace, uses the corresponding number of the Reader and the Writer plugins based on the Task queue to implement the synchronization task.

In another embodiment, the Reader plugin transfers data read by the Reader plugin to the Writer plugin via a channel between the Reader plugin and the Writer plugin.

For example, after the system Framework generates the Task queue, the system Framework may, via the second ClassLoader, by generating a plugin namespace, use the corresponding number of the Reader and the Writer plugins based on the Task queue to implement the synchronization task.

Thus, the system Framework can separate the Reader plugins from the Writer plugins by setting the Reader and the Writer plugin interfaces. The system Framework can also separate the Reader/Writer plugins from the system Framework by using different ClassLoaders to load plugins. The system Framework can also segment the synchronization operation based on different Reader or Writer plugins, to simultaneously start synchronization tasks.

Figure 3:
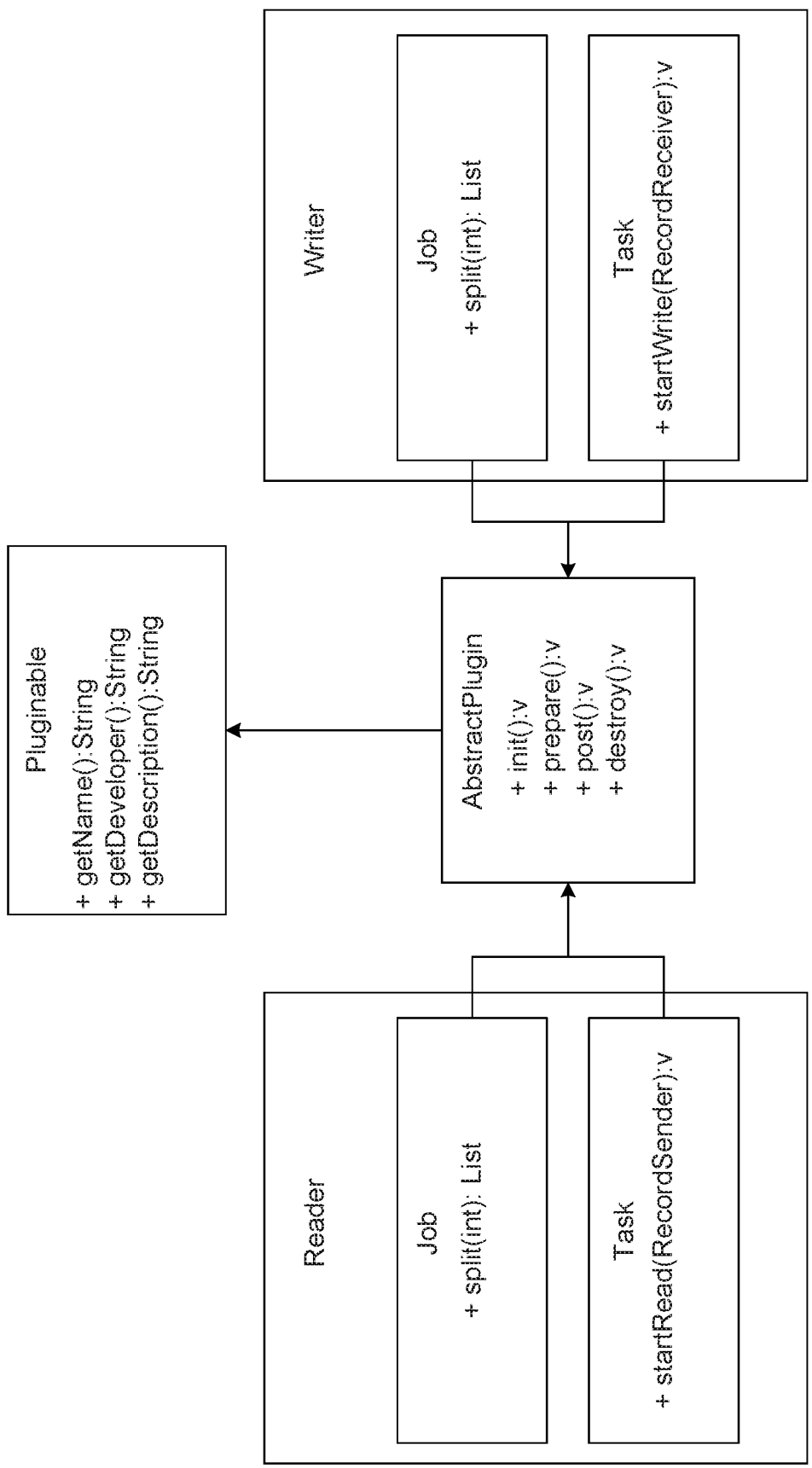
FIG. 3 is a graphical representation illustrating an Application Programming Interface (API) for synchronization among heterogeneous data sources, according to an exemplary embodiment.
Figure 4:
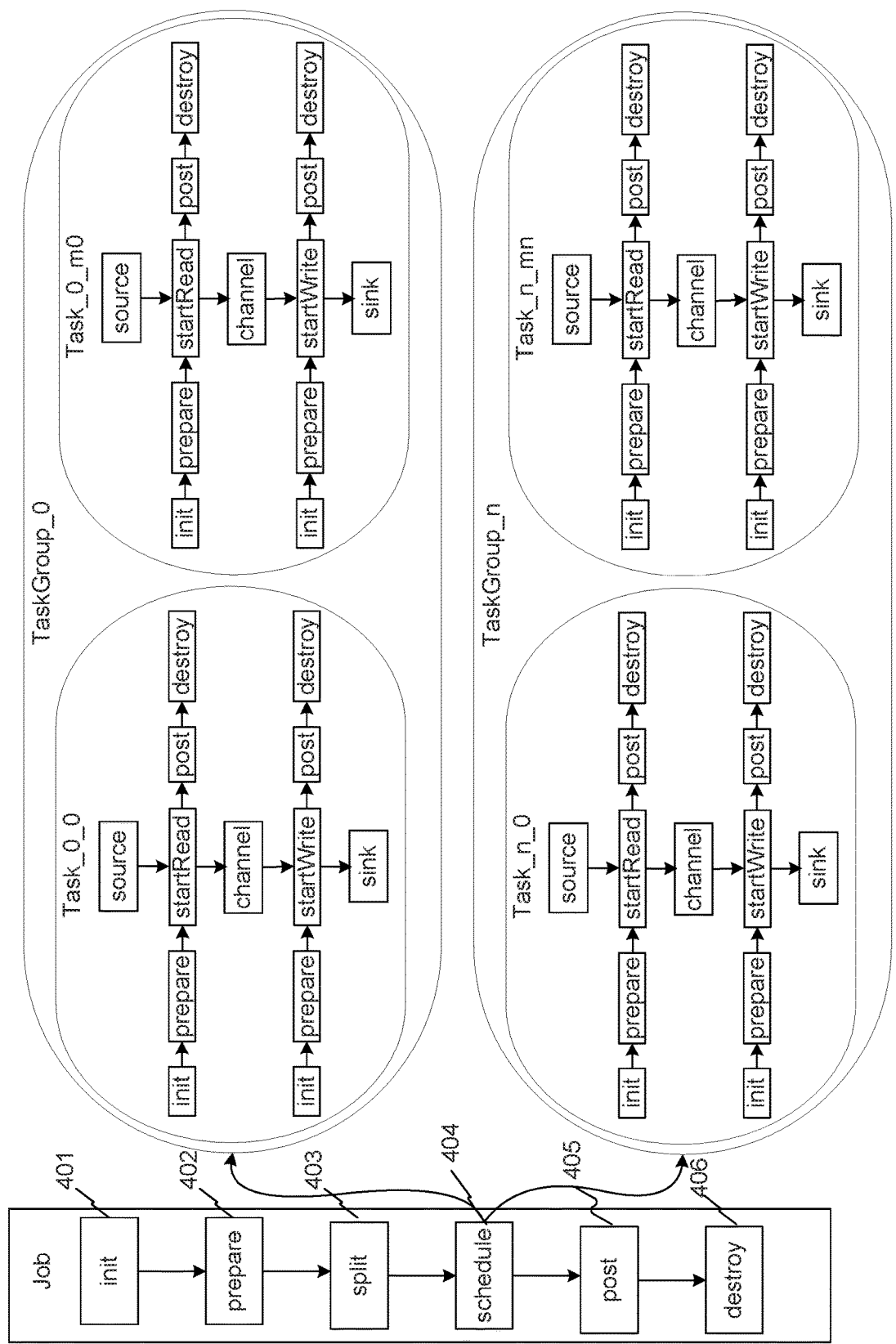
FIG. 4 is a flow diagram illustrating another method for synchronization among heterogeneous data sources, according to an exemplary embodiment.

FIG. 3 is a graphical representation illustrating an Application Programming Interface (API) for synchronization among heterogeneous data sources, according to an exemplary embodiment. FIG. 4 is a flow diagram illustrating another method for synchronization among heterogeneous data sources, according to an exemplary embodiment. Some common features/steps of FIG. 3 and FIG. 4 are described below.

At step 401 (init), the system Framework uses the init( ) method, including, for example, initializing settings or performing other static operations of the Job of the Reader and the Writer plugins.

At step 402 (prepare), the system Framework uses the prepare( ) method, including, for example, probing the connections or performing other dynamic operations of the Job of the Reader and the Writer plugins.

At step 403 (split), the system Framework calls the split( ) method of the Job of the Reader plugin to split the job (the data to be synchronized), and based on the split (segmentation) result, calls the split( ) method of the Job of the Writer plugin, and pair the segmentations to form Tasks. The split( ) methods split/segment the job based on the Reader/Writer plugins and pair the segmentations to form Tasks. For example, a logic table can be split/segmented according to sub-database/sub-table (e.g., database sharding) or a single key.

At step 404 (schedule), the system Framework schedules the Tasks to different TaskGroups according to system resource status (e.g., the number of Tasks in a TaskGroup). The scheduling can be local or distributed. A TaskGroup can be a combination of multiple Tasks, corresponding to the same synchronization operation. The TaskGroups enter the data synchronization operation, based on parallel start of the Tasks.

In some embodiments, step 404 may also comprise the following 6 steps or a combination of the steps:

1) Task initiation (init): a Reader plugin thread and a Writer plugin thread each implement the init( ) method, such as initializing settings or other static operations of the Task.

2) Task preparation (prepare): a Reader plugin thread and a Writer plugin thread each implement the prepare( ) method, such as pretreatment or other dynamic operations of the Task.

3) The Reader plugin implements startRead to transfer data extracted from a source to a Channel.

4) The Writer plugin implements startWrite to write the data in the Channel to a destination.

5) Task submission (post): a Reader plugin thread and a Writer plugin thread each implement the post( ) method of the Task.

6) Task resource recycling (destroy): a Reader plugin thread and a Writer plugin thread each implement destroy( ) method of the Task.

At step 405 (post), the system Framework calls the post( ) method of the Job of the Reader and the Writer plugins at the same time, for example, to print labels.

At step 406 (destroy), the system Framework uses the destroy( ) method of the Job of the Reader and the Writer plugins, for example, to recycle resources.

In the entire operation process, the Job is the system Framework level management, including, internal scheduling, status monitoring, sending and receiving external instructions, status reporting, and so on. The Job uses the Reader and the Writer plugins via ClassLoaders to avoid interaction between the system Framework and the plugins. The Tasks of the Reader and the Writer plugins each run on different threads, and no ClassLoader is needed. By taking advantage of the characteristics of the Java language, including the API(s), and the ClassLoader(s), off-line data synchronization among heterogeneous data sources of structured and semi-structured data can be achieved. This can make data synchronization easier. In addition, splitting Job into Tasks can achieve parallel processing and improve synchronization speed.

Figure 5:
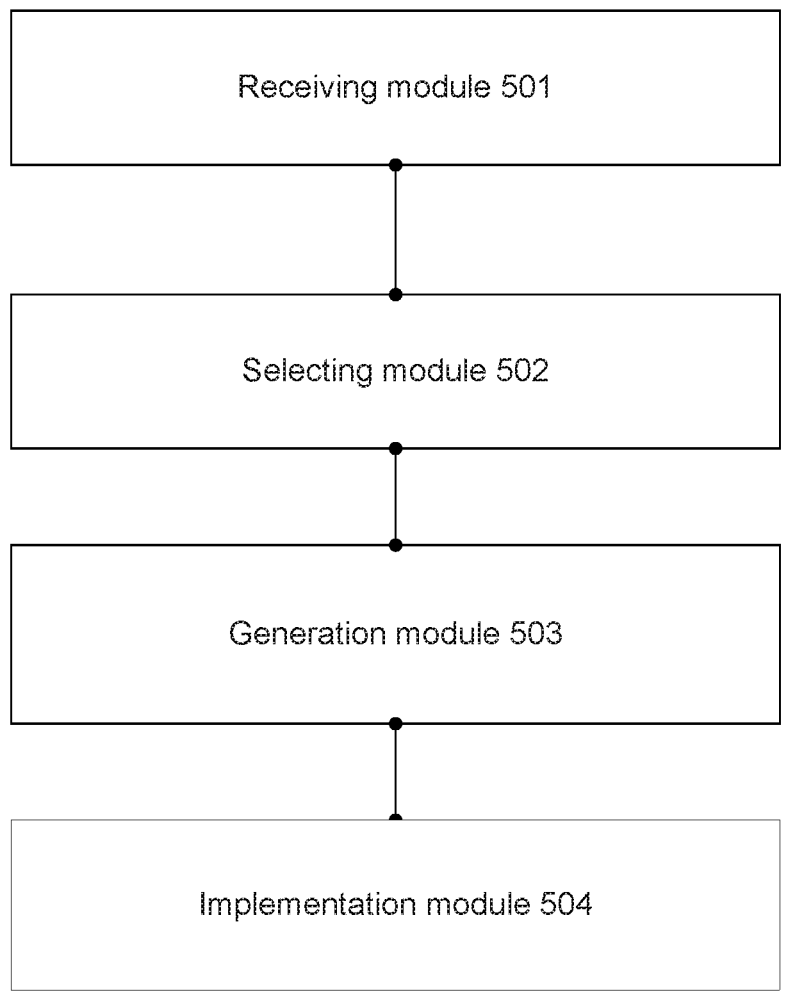
FIG. 5 is a block diagram illustrating an apparatus for synchronization among heterogeneous data sources, according to an exemplary embodiment.

FIG. 5 is a block diagram illustrating an apparatus 500, e.g., the computer system described above in conjunction with the methods, for synchronization among heterogeneous data sources, according to an exemplary embodiment. The apparatus includes a receiving module 501, a selecting module 502, a generation module 503, and an implementation module 504.

The receiving module 501 may be configured to receive a synchronization task and obtain a corresponding operation classification. The receiving module 501 may create a space for receiving and processing synchronization tasks. In one embodiment, a Java ClassLoader may be responsible for loading compiled byte code into a Java virtual machine, creating isolated Java class spaces. The receiving module 501 may receive the synchronization task via a first ClassLoader and determine an operation classification corresponding to the synchronization task. The operation classification may include synchronization in the same system or between different systems. For example, synchronization in the same system can be synchronization in MySQL, and synchronization between different systems can be synchronization between MySQL and Oracle database data.

The selecting module 502 may be configured to select one or more Reader plugins and Writer plugins based on the corresponding operation classification. For data synchronization, the Reader plugin may be responsible for extracting source data and may be pluginable; the Writer plugin may be responsible for writing data to a target position and may also be pluginable.

In one embodiment, the Reader and the Writer plugins may be the same type or different types of plugins.

In one embodiment, the Reader and the Writer plugins each have an independent thread. For example, after the receiving module 501 determines the operation classification, the selecting module 502 can determine corresponding Reader and Writer plugins according to the operation classification. Thus, a synchronization task can use a Reader plugin and a Writer plugin according to the source database type and the destination database type. For example, a MySQLReader plugin reads MySQL and a MySQLWriter writes MySQL. The Reader and the Writer plugins can be the same or different types of plugins. For another example, the Reader and the Writer plugins can both be MySQL database type. For yet another example, the Reader plugin can be a MySQL database type and the Writer plugin can be an Oracle database type. Different types of Reader and Writer plugins can be used in any combination to realize synchronization among data of different source and destination, i.e., separating the Reader plugin and the Writer plugin.

The generation module 503 may be configured to segment the synchronization task based on the Reader and Writer plugins to generate a Task queue, the Reader plugin being configured to read data from a source and to send to the Writer plugin and the Writer plugin being configured to write the data to a destination.

In one embodiment, the Reader and the Writer plugins each include init( ), prepare( ), post( ), and destroy( ) methods. For example, after the selecting module 502 determines the corresponding Reader and Writer plugins, the generation module 503 segments the synchronization task based on the Reader and Writer plugins to generate a Task queue. The Reader and the Writer plugin each include two parts: a Job and a Task. The Job may be a complete synchronization operation, corresponding to a logic table. The Task may be a part (e.g., a finest part) of a complete synchronization operation, corresponding to a sub logic table or a data segment. Thus, the Job can embody a realization of the system Framework and the Task can embody a realization of the synchronization task segmentation, separating the system Framework and the plugins.

In some embodiments, the Job of the Reader plugin can be different from the Job of the Writer plugin. The Task of the Reader plugin may comprise methods such as startReader( ) to extract data from a source. The Task of the Writer plugin may comprise a startWrite( ) method, to write data to a destination. The Job and the Task can implement methods such as inti( ), prepare( ), post( ), and destroy( ), for preparation before the actual data synchronization and cleanup after the synchronization. The Reader and the Writer plugins may comprise settings, such as name, data-entry-class, and description, which can be loaded at system Framework level.

In some embodiments, the Reader and the Writer plugins, when implemented, can each include a Job and a Task. The Job and the Task can, but not necessarily, include the methods described above depending on the operation environment. The Job may comprise methods such as inti( ), prepare( ), post( ), and destroy( ). Method init( ) can initialize a global operation, such as checking if settings are legal or adjusting settings. Method prepare( ) can prepare for the global operation, such as printing external labels during Job operation or cleaning data at a destination. Method post( ) can follow-up after the global operation, such as printing external labels after the Job operation and releasing global resources. Method destroy( ) can clean-up the global operation, such as cleaning up logs.

The Task may comprise methods such as inti( ), prepare( ), post( ), and destroy( ). Method init( ) can initialize some operation after the segmentation, such as checking if the settings of the corresponding plugin are complete or adjusting the settings of the corresponding plugin. Method prepare( ) can prepare for some operations after the segmentation, such as probing connections. Method post( ) can follow-up after some post-segmentation operations, such as releasing connections. Method destroy( ) can clean-up some post-segmentation operation, such as releasing internal memory space.

The implementation module 504 may be configured to use a corresponding number of the Reader and the Writer plugins based on the Task queue to implement the synchronization task.

In one embodiment, the implementation module 504 uses, via a second ClassLoader, by generating a plugin namespace, the corresponding number of the Reader and the Writer plugins based on the Task queue to implement the synchronization task. The Reader plugin transfers data read by the Reader plugin to the Writer plugin via a channel between the Reader plugin and the Writer plugin. For example, after the generation module 503 generates the Task queue, the implementation module 504 may, via the second ClassLoader, use the corresponding number of the Reader and the Writer plugins based on the Task queue to implement the synchronization task by generating the plugin namespace.

Thus, the apparatus 500 can separate the Reader plugins from the Writer plugins by setting the Reader and the Writer plugin interfaces. The system Framework can also separate the Reader/Writer plugins from the system Framework by using different ClassLoaders to load plugins. The system Framework can also segment the synchronization task based on different Reader or Writer plugins, to simultaneously start synchronization tasks.

The methods/steps described above may be implemented as a computer program product. Components such as the system Framework, various plugins, and ClassLoaders described above may also be implemented as a computer program product. The apparatus described above with reference to FIGS. 1-5 may each include a processor and a non-transitory computer readable storage medium storing instructions that, when executed by the processor, perform the method(s) described above. The processor may include the modules described above with reference to FIG. 5.

A person skilled in the art can further understand that various exemplary logic blocks, modules, circuits, and algorithm steps described with reference to the disclosure herein may be implemented as electronic hardware, computer software, or a combination of electronic hardware and computer software. For examples, the modules/units may be implemented by a processor executing software instructions stored in the computer readable storage medium. The hardware may include a discrete logic circuit with logic gate circuits that implement logic functions of data signals, an ASIC with a suitable combination of logic gate circuits, a programmable gate array (PGA), or a field programmable gate array (FPGA).

The flowcharts and block diagrams in the accompanying drawings show system architectures, functions, and operations of possible implementations of the system and method according to multiple embodiments of the present invention. In this regard, each block in the flowchart or block diagram may represent one module, one program segment, or a part of code, where the module, the program segment or a part of code includes one or more executable instructions used for implementing specified logic functions. It should also be noted that, in some alternative implementations, functions marked in the blocks may also occur in a sequence different from the sequence marked in the drawing. For example, two consecutive blocks actually can be executed in parallel substantially, and sometimes, they can also be executed in reverse order, which depends on functions involved. Each block in the block diagram and/or flowchart, and a combination of blocks in the block diagram and/or flowchart may be implemented by a dedicated hardware-based system for executing corresponding functions or operations, or may be implemented by a combination of dedicated hardware and computer instructions.

As will be understood by those skilled in the art, embodiments of the present disclosure may be embodied as a method, a system or a computer program product. Accordingly, embodiments of the present disclosure may take the form of an entirely hardware embodiment, an entirely software embodiment or an embodiment combining software and hardware. Furthermore, embodiments of the present disclosure may take the form of a computer program product embodied in one or more computer available storage media (including but not limited to a magnetic disk memory, a CD-ROM, an optical memory and so on) containing computer available program codes.

Embodiments of the present disclosure are described with reference to flow diagrams and/or block diagrams of methods, devices (systems), and computer program products according to embodiments of the present disclosure. It will be understood that each flow and/or block of the flow diagrams and/or block diagrams, and combinations of flows and/or blocks in the flow diagrams and/or block diagrams, can be implemented by computer program instructions. These computer program instructions may be provided to a processor of a general-purpose computer, a special-purpose computer, an embedded processor, or other programmable data processing devices to produce a machine, such that the instructions, which are executed via the processor of the computer or other programmable data processing devices, create a means for implementing the functions specified in one or more flows in the flow diagrams and/or one or more blocks in the block diagrams.

These computer program instructions may also be stored in a computer readable memory that can direct a computer or other programmable data processing devices to function in a particular manner, such that the instructions stored in the computer readable memory produce a manufactured product including an instruction means which implements the functions specified in one or more flows in the flow diagrams and/or one or more blocks in the block diagrams.

These computer program instructions may also be loaded onto a computer or other programmable data processing devices to cause a series of operational steps to be performed on the computer or other programmable devices to produce processing implemented by the computer, such that the instructions which are executed on the computer or other programmable devices provide steps for implementing the functions specified in one or more flows in the flow diagrams and/or one or more blocks in the block diagrams. In a typical configuration, a computer device includes one or more Central Processing Units (CPUs), an input/output interface, a network interface and a memory. The memory may include forms of a volatile memory, a random access memory (RAM), and/or non-volatile memory and the like, such as a read-only memory (ROM) or a flash RAM in a computer readable storage medium. The memory is an example of the computer readable storage medium.

The computer readable storage medium refers to any type of physical memory on which information or data readable by a processor may be stored. Thus, a computer readable storage storage medium may store instructions for execution by one or more processors, including instructions for causing the processor(s) to perform steps or stages consistent with the embodiments described herein. The computer readable storage medium includes non-volatile and volatile media, removable and non-removable media, wherein information storage can be implemented with any method or technology. Information may be modules of computer readable instructions, data structures and programs or other data. Examples of a computer storage storage medium include, but are not limited to, a phase-change random access memory (PRAM), a static random access memory (SRAM), a dynamic random access memory (DRAM), other types of random access memories (RAMs), a read-only memory (ROM), an electrically erasable programmable read-only memory (EEPROM), a flash memory or other memory technologies, a compact disc read-only memory (CD-ROM), a digital versatile disc (DVD) or other optical storage, a cassette tape, tape or disk storage or other magnetic storage devices or any other non-transmission media which may be used to store information capable of being accessed by a computer device. The computer readable storage medium is non-transitory, and does not include transitory media, such as modulated data signals and carrier waves.

The specification has described methods, apparatus, and systems for data synchronization among heterogeneous data sources. The illustrated steps are set out to explain the exemplary embodiments shown, and it should be anticipated that ongoing technological development will change the manner in which particular functions are performed. Thus, these examples are presented herein for purposes of illustration, and not limitation. For example, steps or processes disclosed herein are not limited to being performed in the order described, but may be performed in any order, and some steps may be omitted, consistent with disclosed embodiments. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

It will be appreciated that the present invention is not limited to the exact construction that has been described above and illustrated in the accompanying drawings, and that various modifications and changes can be made without departing from the scope thereof. It is intended that the scope of the invention should only be limited by the appended claims.

What is claimed is:

1. A method for synchronizing data among heterogeneous data sources, implemented by a processor, comprising:
obtaining a synchronization task and a corresponding operation classification;
determining one or more Reader plugins and one or more Writer plugins based on the corresponding operation classification, wherein the corresponding operation classification indicates whether the synchronization task is between different types of database systems or between a same type of database system, and wherein the one or more Reader plugins are associated with a first type of data source, the one or more Writer plugins are associated with a second type of data source, and the first type of data source is different from or the same with the second type of data source;

segmenting the synchronization task based on the one or more Reader plugins and Writer plugins to generate a Task queue, the one or more Reader plugins being configured to read data from a source and to send to the one or more Writer plugins, and the one or more Writer plugins being configured to write the data to a destination, wherein tasks in the Task queue are processed in parallel; and implementing the synchronization task using a corresponding number of the Reader plugins and the Writer plugins based on the Task queue.

2. The method of claim 1, wherein:
the synchronization task is obtained by a first ClassLoader; and
the corresponding number of the Reader plugins and the Writer plugins based on the Task queue are used by a second ClassLoader.

3. The method of claim 1, wherein the one or more Reader plugins are configured to send the data to the Writer plugins via a channel between the Reader plugins and the Writer plugins.

4. The method of claim 1, wherein the one or more Reader plugins and the Writer plugins each have an independent thread.

5. The method of claim 1, wherein the one or more Reader plugins and the Writer plugins include init( ), prepare( ), post( ), and destroy( ) methods.

6. An apparatus for synchronizing data among heterogeneous data sources comprising:
a memory storing instructions; and
a processor configured to execute the instructions to cause the apparatus to perform:
obtaining a synchronization task and a corresponding operation classification;
determining one or more Reader plugins and one or more Writer plugins based on the corresponding operation classification, wherein the corresponding operation classification indicates whether the synchronization task is between different types of database systems or between a same type of database system, and wherein the one or more Reader plugins are associated with a first type of data source, the one or more Writer plugins are associated with a second type of data source, and the first type of data source is different from or the same with the second type of data source;
segmenting the synchronization task based on the one or more Reader plugins and Writer plugins to generate a Task queue, the one or more Reader plugins being configured to read data from a source and to send to the Writer plugins and the Writer plugins being configured to write the data to a destination, wherein tasks in the Task queue are processed in parallel; and
implementing the synchronization task using a corresponding number of the Reader plugins and the Writer plugins based on the Task queue.

7. The apparatus of claim 6, wherein:
the synchronization task is obtained by using a first ClassLoader; and
the synchronization task is implemented by using a second ClassLoader.

8. The apparatus of claim 6, wherein the one or more Reader plugins are configured to send the data to the Writer plugins via a channel between the Reader plugins and the Writer plugins.

9. The apparatus of claim 6, wherein the one or more Reader plugins and the Writer plugins each have an independent thread.

10. The apparatus of claim 6, wherein the one or more Reader plugins and the Writer plugins include init( ), prepare( ), post( ), and destroy( ) methods.

11. A non-transitory computer-readable storage medium storing one or more programs, the one or more programs comprising instructions which, when executed by a processor of a computer system, cause the computer system to perform a method, comprising:
obtaining a synchronization task and a corresponding operation classification;
determining one or more Reader plugins and one or more Writer plugins based on the corresponding operation classification, wherein the corresponding operation classification indicates whether the synchronization task is between different types of database systems or between a same type of database system, and wherein the one or more Reader plugins are associated with a first type of data source, the one or more Writer plugins are associated with a second type of data source, and the first type of data source is different from or the same with the second type of data source;
segmenting the synchronization task based on the one or more Reader plugins and Writer plugins to generate a Task queue, the one or more Reader plugins being configured to read data from a source and to send to the Writer plugins and the Writer plugins being configured to write the data to a destination wherein tasks in the Task queue are processed in parallel; and
implementing the synchronization task using a corresponding number of the Reader plugins and the Writer plugins based on the Task queue.

12. The non-transitory computer-readable storage medium of claim 11, wherein:
the obtaining a synchronization task is performed by a first ClassLoader; and
corresponding number of the Reader plugins and the Writer plugins based on the Task queue are used by a second ClassLoader.

13. The non-transitory computer-readable storage medium of claim 11, wherein the one or more Reader plugins are configured to send the data to the Writer plugins via a channel between the Reader plugins and the Writer plugins.

14. The non-transitory computer-readable storage medium of claim 11, wherein the one or more Reader plugins and the Writer plugins each have an independent thread.

15. The non-transitory computer-readable storage medium of claim 11, wherein the one or more Reader plugins and the Writer plugins include init( ), prepare( ), post( ), and destroy( ), methods.

16. The method of claim 1, wherein segmenting the synchronization task further comprises:
segmenting the synchronization task based on the one or more Reader plugins;
segmenting the synchronization task based on the one or more of Writer plugins; and pairing the segmentations to form a plurality of tasks in the Task queue.

17. The method of claim 16, wherein implementing the synchronization task further comprises:
scheduling the plurality of tasks to different TaskGroups; and
performing synchronization on the TaskGroups based on a parallel start of the plurality of tasks.

* * * * *